United States Patent
Morin et al.

(10) Patent No.: US 12,301,164 B2
(45) Date of Patent: May 13, 2025

(54) TERRAIN FOLLOWING SOLAR TRACKER

(71) Applicant: Nextracker LLC, Fremont, CA (US)

(72) Inventors: Jacob Mark Morin, Phoenix, AZ (US);
David Kresse, Walnut Creek, CA (US);
Daniel Y Abraham, Oakland, CA (US);
Angel Galván Caride, Madrid (ES);
Jeevan Vadakapuram, Karimnagar (IN)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 17/989,556

(22) Filed: Nov. 17, 2022

(65) Prior Publication Data

US 2023/0155539 A1 May 18, 2023

Related U.S. Application Data

(60) Provisional application No. 63/280,990, filed on Nov. 18, 2021.

(51) Int. Cl.
*H02S 20/32* (2014.01)
*H02S 20/10* (2014.01)

(52) U.S. Cl.
CPC ............ *H02S 20/32* (2014.12); *H02S 20/10* (2014.12)

(58) Field of Classification Search
CPC ................... H01L 31/00–078; H02S 20/00–32
See application file for complete search history.

(56) References Cited

U.S. PATENT DOCUMENTS

| | | | |
|---|---|---|---|
| 9,528,724 B1 | 12/2016 | Hines et al. | |
| 10,190,801 B1 | 1/2019 | Almotlaq et al. | |
| 2003/0034029 A1* | 2/2003 | Shingleton | F24S 25/12 126/600 |
| 2004/0238025 A1 | 12/2004 | Shingleton | |
| 2014/0140755 A1* | 5/2014 | Clavijo Lumbreras | F16C 35/02 403/57 |
| 2014/0216522 A1* | 8/2014 | Au | H02S 20/32 136/246 |
| 2017/0366133 A1* | 12/2017 | Taha | H02S 20/30 |
| 2020/0052644 A1* | 2/2020 | Taha | H02S 20/32 |
| 2020/0182513 A1 | 6/2020 | Ma et al. | |

FOREIGN PATENT DOCUMENTS

DE 202014100397 U1 * 3/2015 ............... F24J 2/526

OTHER PUBLICATIONS

DE-202014100397-U1 English (Year: 2014).*
PCT Search Report and Written Opinion issued in PCT Application No. PCT/US2022/050312 dated Mar. 28, 2023.

* cited by examiner

*Primary Examiner* — Bach T Dinh
(74) *Attorney, Agent, or Firm* — Fredrikson & Byron, P.A.

(57) ABSTRACT

A solar tracker, solar array, and method of designing a solar tracker or array including a plurality of piers, a torque tube supported by the piers, each pier having a common reveal from the earth and the torque tube has a relative angle from a first pier to a second pier of between 0.25 and about 0.75 degrees.

16 Claims, 9 Drawing Sheets

TERRAIN FOLLOWING SOLAR TRACKER

CROSS-REFERENCE TO RELATED APPLICATION

The present application claims the benefit of, and priority to, U.S. Provisional Patent Application Ser. No. 63/280,990, filed on Nov. 18, 2021, the entire content of which is hereby incorporated by reference herein.

FIELD

The application is directed to a solar trackers and solar tracker arrays and a method of analyzing a build site to determine the specifications of the solar tracker and components in the solar tracker across the build site.

BACKGROUND

One of the most significant, costly, and time consuming aspects relating to the manufacture and installation of solar trackers is the requirement that the site be substantially level. While certainly some sits are generally level, most terrain has some undulation and in some instances quite a significant pitch to the terrain. In practical terms this required installers of solar trackers to conduct significant amount of earth excavation and moving. Such earthworks are time consuming, require significant amounts of heavy machinery, and are subject to a significant amount or regulation. Indeed, some projects have been halted owing to the environmental impact of the earthmoving required to produce a relatively level site for the installation of the solar trackers.

An alternative to massive earth works is the use of custom pier heights. A solar tracker is typically comprised of a torque tube that supports the solar panels and is itself supported by piers imbedded into the ground. A second method of addressing changing terrain is the use of piers which are formed specific to the location in which they will be embedded in the ground. In this way the level of the torque tube can remain consistent without requiring the moving or removing of earth. However, while the earthmoving costs are reduced, there are additional financial and timing costs associated with custom piers. First, these are custom length piers which require custom length determinations. Next, the custom piers need to be accurately identified and sorted with the respect to the site to they can be installed in their custom location. All of this takes resources and ultimately increase the cost of the installation. Accordingly, improvements are needed.

SUMMARY

One aspect of the disclosure is directed to a solar tracker including: a plurality of piers, each pier configured to be mounted in the earth at a specific distance from a second pier, the distance between piers defining a bay; and a torque tube extending between the plurality of piers, the torque tube formed of a plurality of sections, having at least one end which is swagged to enable insertion of the swaged end of one torque tube section into an unswaged section of a section; where each pier has a common reveal from the earth and the torque tube has a relative angle from a first pier to a second pier of between 0.25 and about 0.75 degrees. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The solar tracker where a difference in pier height from the first pier to the second pier is between 1 and 4.5 inches. The solar tracker where a maximum north-south slope is between 5 and 8.5 degrees. The solar tracker where the relative angle between the plurality of piers varies along the torque tube such that the torque tube follows variations in terrain. The solar tracker further including a custom pier, where the custom pier has a reveal different from the plurality of piers.

A further aspect of the disclosure is directed to a solar array including: a plurality of solar trackers, each solar tracker including a plurality of piers, each pier configured to be mounted in the earth at a specific distance from a second pier, the distance between piers defining a bay; and a torque tube extending between the plurality of piers, the torque tube formed of a plurality of sections; where in each section the torque tube defines an angle relative to adjacent sections of between 0.25 and about 0.75 degrees.

Implementations of this aspect of the disclosure may include one or more of the following features. The solar array where a difference in pier height from a first pier to a second pier is between 1.5 and 4.5 inches. The solar array where a maximum north-south slope is between 3.5 and 5 degrees. The solar array where the relative angle of each section varies along the torque tube such that the torque tube follows variations in terrain. The solar array further including a custom pier, where the custom pier has a reveal different from the plurality of piers. Implementations of the described techniques may include hardware, a method or process, or computer software on a computer-accessible medium, including software, firmware, hardware, or a combination of them installed on the system that in operation causes or cause the system to perform the actions.

A further aspect of the disclosure is directed to a method of performing a site assessment for a solar array including: acquiring a topographical survey may, applying north-south tracker lines to the topographical survey map, assessing changes in elevation along each north-south line. The method also includes determining angle changes for a first pier to a second pier along the north-south line of a solar tracker. The method also includes identifying locations along the north-south line that are out of tolerance for pre-loading torque tubes of the solar tracker. The method also includes identifying locations on the survey map to place one or more solar trackers. Other embodiments of this aspect include corresponding computer systems, apparatus, and computer programs recorded on one or more computer storage devices, each configured to perform the actions of the methods and systems described herein.

Implementations of this aspect of the disclosure may include one or more of the following features. The method further including identifying one or more locations along the north-south line where a break is required along the solar tracker. The method further including determining if one or more locations for application of a custom pier. The method further including determining if one or more locations require earth grading. The method where the angle changes along the north-south line of the solar tracker that are within the tolerances for pre-load of the torque tubes enable the torque tube to follow variations in terrain. Implementations of the described techniques may include hardware, a method or process, or computer software on a computer-accessible medium, including software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

Objects and features of the presently disclosed system and method will become apparent to those of ordinary skill in the art when descriptions of various embodiments thereof are read with reference to the accompanying drawings, of which.

DETAILED DESCRIPTION

This disclosure is directed to a terrain following solar tracker and a system and method for analysis of the typography of a solar tracker build site. The system and method are capable of identifying specifications for the components of the solar trackers and any customized components required for any portion of the build site.

Figure 1:
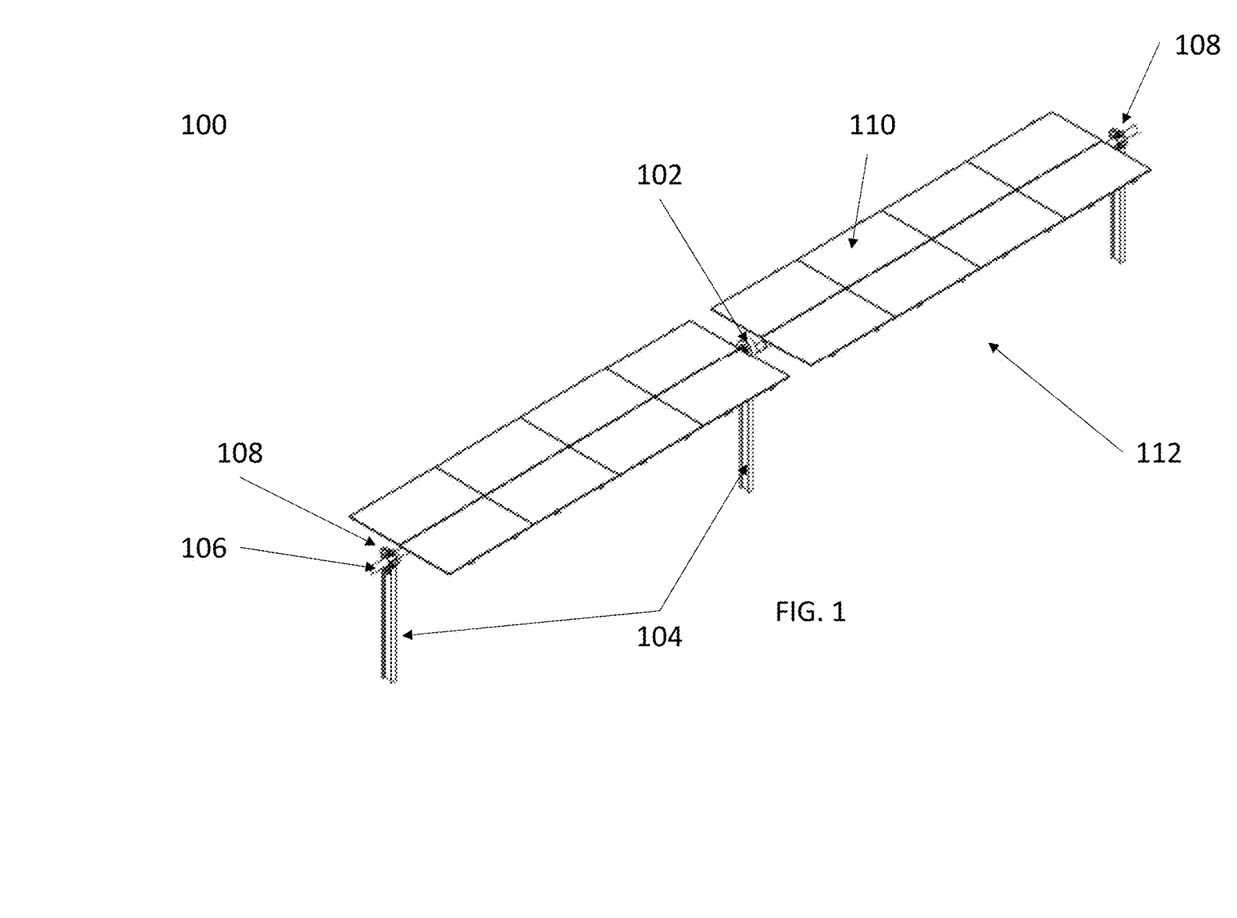
FIG. 1 depicts a perspective view of solar tracker in accordance with the disclosure.

FIG. 1 depicts a solar tracker 100 in accordance with the disclosure. The solar tracker 100 includes a drive mechanism 102 supported on a pier 104. A torque tube 106 extends from the drive mechanism 102 and extends to a bearing 108. The bearing 108 is supported by a pier 104. Solar panels 110 are supported by the torque tube 106. The span between two piers 104 is referred to as a bay 112 and may be generally in the range of about 8 meters in length. A plurality of solar trackers 100 can be arranged in a north-south longitudinal orientation to form an solar array.

Figure 2:
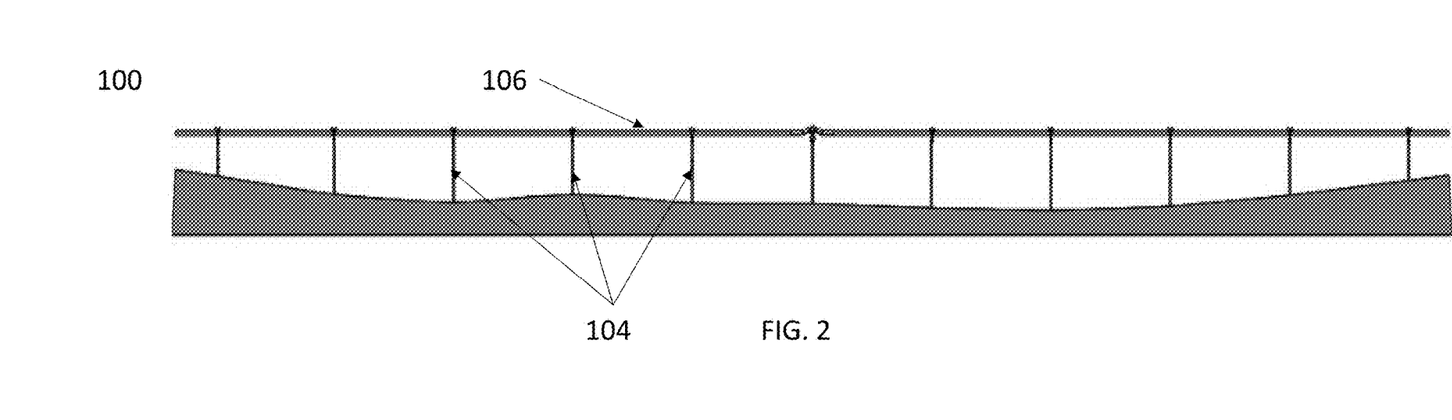
FIG. 2 depicts a profile view of a solar tracker on generally flat ground.

FIG. 2 depicts a traditional solar tracker 100 arranged on substantially flat terrain. As can be seen, the reveal of each of the piers 104 (the amount it extends above the ground) is somewhat different from its neighboring piers. Where the differences in height of the ground is relatively small (e.g., within about 0.1 degree of elevation change from one pier to the next) then a common size pier 104 may be employed and simply driven into the ground to a slightly different depths to maintain the torque tube 106 substantially parallel to the ground.

It is common for solar arrays where all of the solar trackers 100, as shown in FIG. 2, have torque tubes 106 that are kept substantially level can nonetheless have different specifications depending on where in the array they are located. For example, it is common for these level ground arrays for the torque tubes 106 of inner solar trackers 100 often have a thinner wall thickness than the solar trackers 100 are located on the East or West edges of the array. In large part this difference in wall thickness is required because the eastern most and western most solar trackers are subjected to the most wind loading based on their location in the array. The outer most solar trackers 100 and even second, third, fourth solar tracker will absorb the wind loading, and the inner solar trackers 100 receive less wind loading.

Typically, while doing a site analysis the manufacturers and installers of the solar array will conduct environmental analyses. Some of the environmental factors include windspeeds experienced at the site. This can include average windspeed, maximum wind speed, duration of wind events, frequency of wind events, timing of wind events, correlation to other weather (e.g., wind or rain events), and others. As will be appreciated, where wind events are also associated with rain and snow events, often the wind loading that is actually less owing to the changes in orientation of the solar tracker 100 to capture diffuse light during these events as compared to normal tracking. All of these factors provide input to the specifications for the torque tube 106, and other components of the solar tracker 100.

Figure 3:
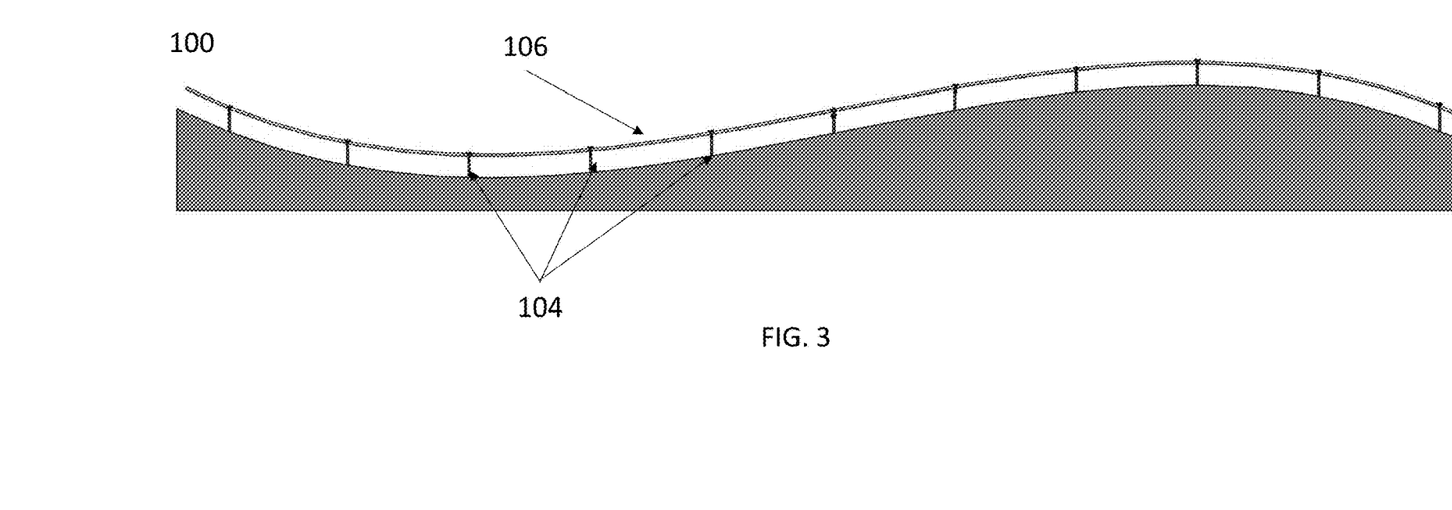
FIG. 3 depict a profile view of a solar tracker on rolling terrain.

FIG. 3 depicts a solar tracker 100 in accordance with the disclosure. As can be seen in FIG. 3 the solar tracker 100 follows the contours of the terrain. As can be seen in FIG. 3, the reveal of each of the piers 104 is the same. That is each pier 104 extends from the ground the same amount. The result is that the tops of the piers, and the torque tube 106 supported on those piers substantially parallel the contours of the terrain. In accordance with one aspect of the disclosure the change in slope along the torque tube 106 can be up to about 0.75 degrees per bay and a pier-to-pier height differential of about 10.5 cm.

The torque tube 106 is typically formed of a round, square, rectangular, or D-shaped tube, wherein one end of the tube is swaged such that a portion of its outer diameter is compressed to fit into the inner diameter of unswagged portion of the torque tube 106. These over lapping sections (i.e., having a double wall thickness) are typically placed proximate the piers 104 where the highest bending moments are experienced, thus the doubling of the wall enables the individual wall thickness of the torque tube to be reduced.

The torque tube 106, however, when mounted in the bearings 108 or to the drive mechanism 102 that are respectively mounted on the piers 104 that are at difference heights relative to one another results in pre-loading of the torque tubes 106. This pre-loading, caused by bending the torque tube 106 to conform to the piers allows the torque tube 106 to follow the terrain, as shown in FIG. 3. While the pre-loading of the torque tube 106 requires force to achieve, the time and energy required to pre-load the torque tubes 106 is significantly less than that required to grade the earth to crate a level grade. Further, the use of a common reveal of the piers 104 makes sourcing of the piers 104 easier as they can be manufactured to a common length and at the site no sorting or ensuring that the correct pier 104 is being employed at any single location. Rather the common length piers 104 can simply be embedded in the ground one after the other with no consideration of where in the site the pier 104 is being placed.

As will be appreciated, the pre-loading of the torque tube 106 is another force that needs to be accounted for in the design of the solar tracker 100. As a result, a wall thickness for each torque tube 106 may be specified for each bay depending on the degree of angular difference between the two piers 104 across which the torque tube 106 spans to form the bay. However, in general tubes of only one or possibly two wall thickness will be specified for a given array which can further simplify the construction process by reducing the number of different components used in the array. And even where the heaviest wall thickness is specified for the entire array, where for example the entire site consists of rolling terrain, the cost of the thicker wall torque tubes 106 is still much less than the time and cost of grading and moving earth to produce a flatter site.

Another aspect of the disclosure is directed a solar tracker 100 that primarily follows the terrain as depicted in FIG. 3, but where necessary, for example, where the change in elevation of the terrain would require applying application of stresses that exceed the tolerances of the torque tube 106. In such instances, an array may include selective piers 104 that are designed to have a greater reveal than the otherwise standard pier 104 that is used in rolling terrain. However, due to the ability to pre-load the torque tubes 106 to follow the terrain, the number and frequency of these non-standard piers 104 can be greatly reduced as compared to when seeking to maintain the torque tube 106 substantially parallel to the ground. In this way, the specialized piers 104 that are needed for a particular site can be greatly reduced, and these can be specially noted and installed separately from the remainder of the piers 104 in the array.

Figure 4:
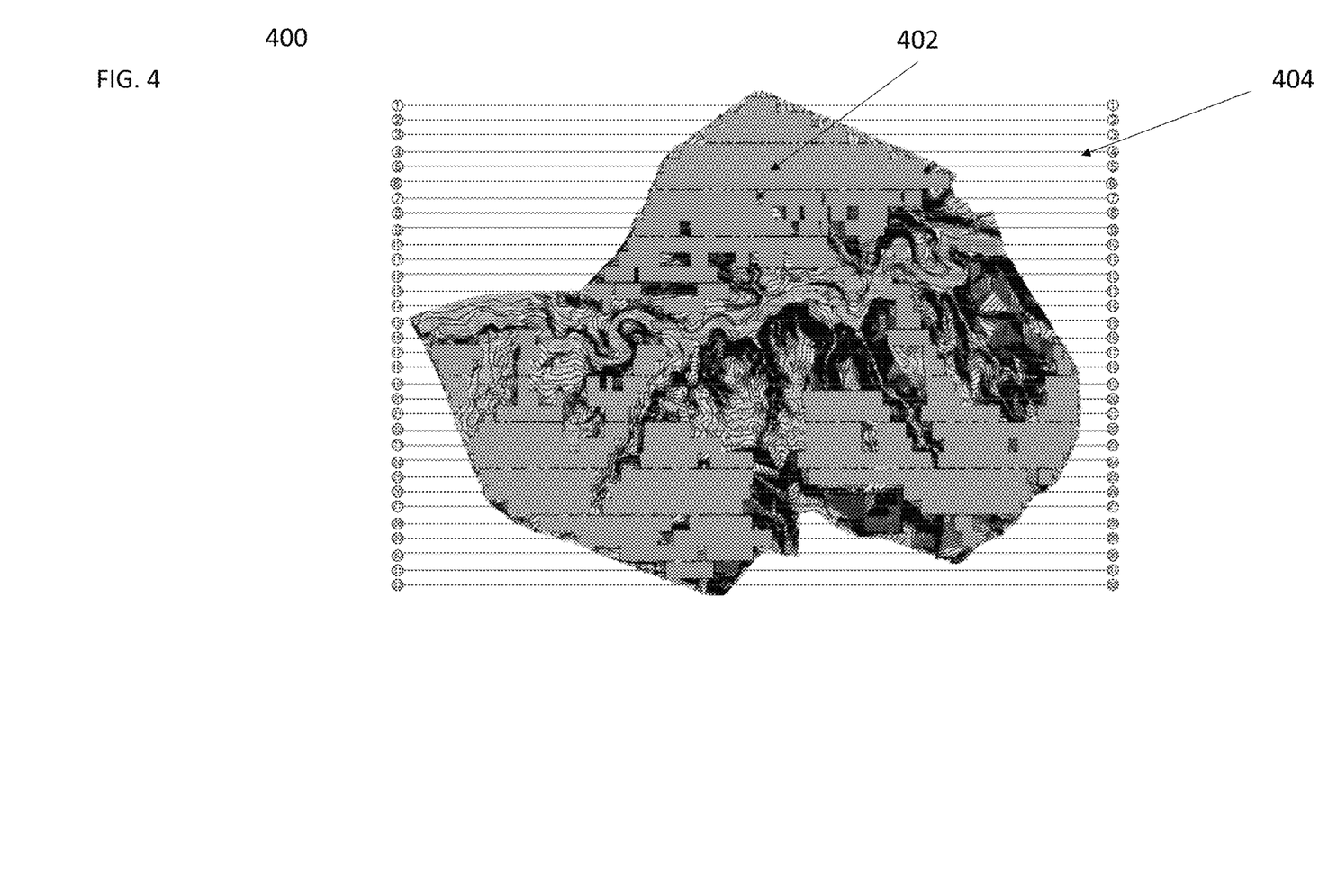
FIG. 4 depicts a survey map of a site for installation of a solar array.

Another aspect of the disclosure is directed to a method of designing a solar array in rolling terrain. FIG. 4 depicts a topographical survey map 400 for site for installation of a solar array 402. The site has heavily rolling terrain, some of which has too great a change in elevation for placement of a solar tracker 100, as will be explained further below. The north-south lines 404 extending through the survey map indicate the potential lines along which solar trackers 100 may be placed. These lines 404 are spaced sufficiently apart to limit row-to-row shading and other interactions between the solar trackers 100 as the solar trackers rotate. However, as noted by the absence of solar trackers 100 (here marked by grey squares), certain portions of the terrain have too great a change in elevation to support a solar tracker 100. For any given site the goal is to enable as much coverage of the site with solar trackers 100 and solar panels 110 as possible.

Figure 5:
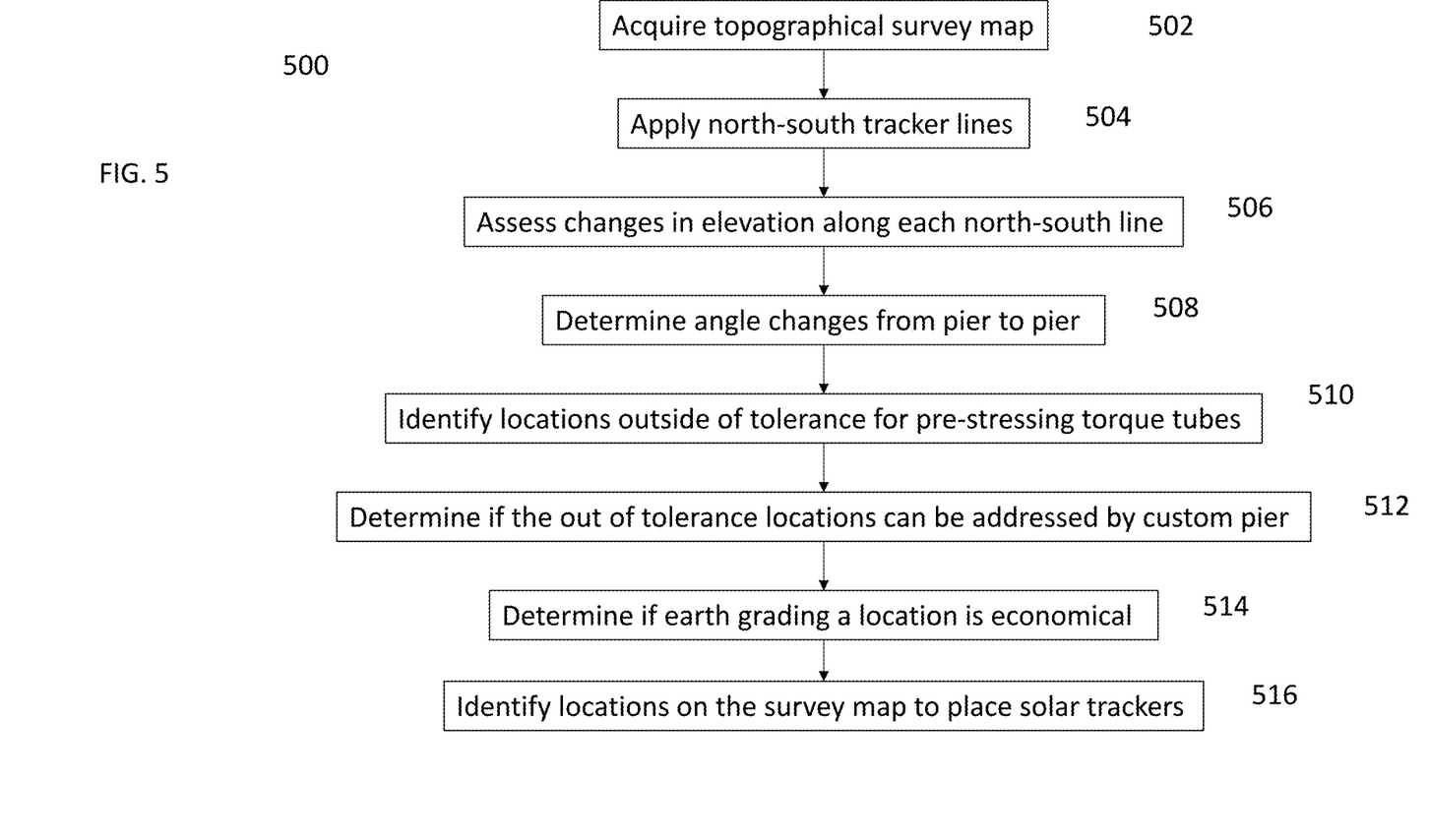
FIG. 5 describes a method in accordance with the disclosure.

A method 500 of determining the location and make-up of the solar trackers for the site is described in FIG. 5. At step 502 a topographical survey may is acquired. This may be done by local manual survey methods employing transits and theodolites, the use of drones to capture images of the site, the use of satellite imagery, and other methods as well as combinations of the same. The goal of these methods is to determine a sufficiently accurate survey of the terrain, particularly in the north-south direction to determine which portions of the site are suitable for placement of solar trackers 100.

Figure 6:
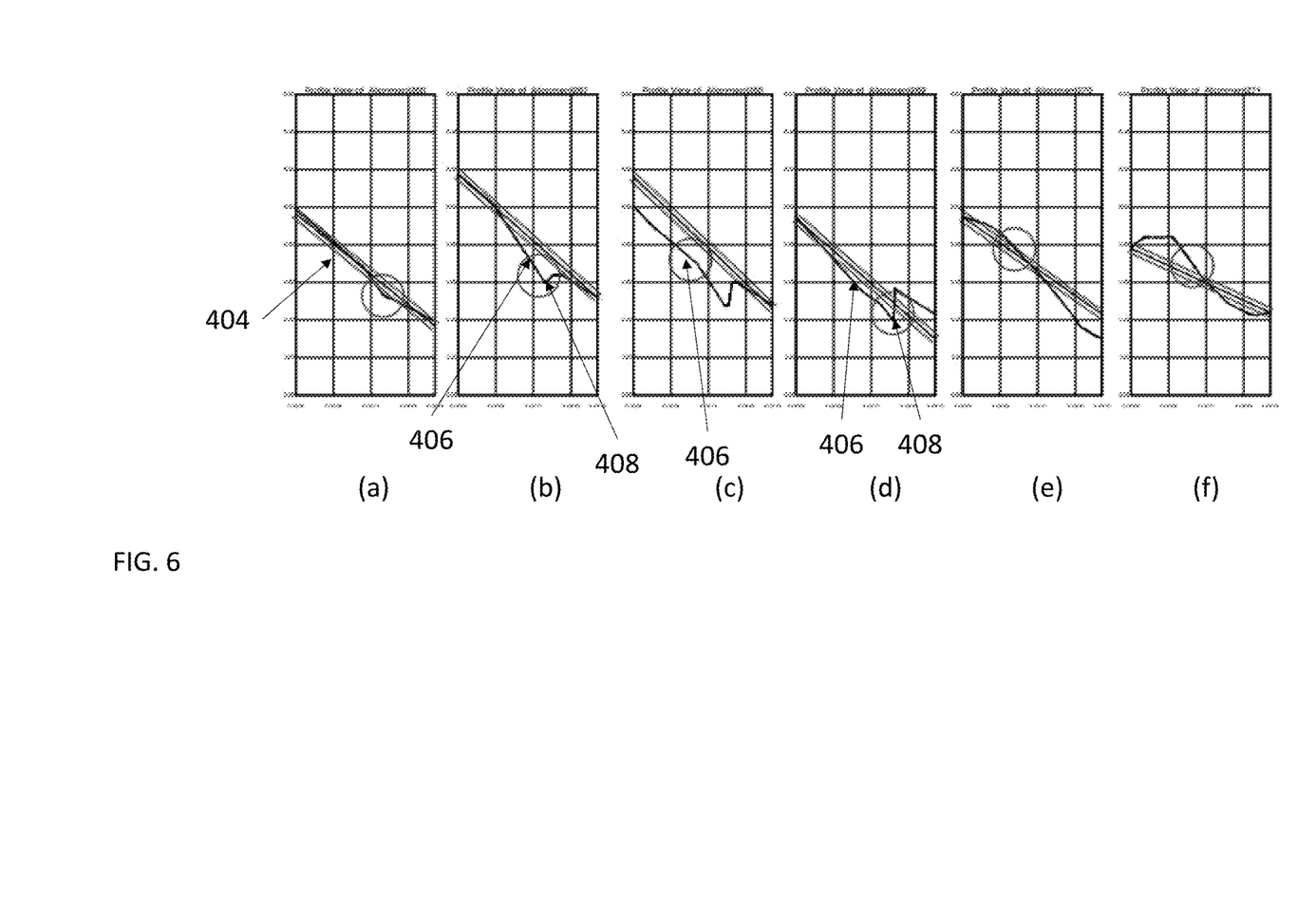
FIG. 6 depicts frames for analysis of the terrain in the survey map of FIG. 4.

At step 504, the north south lines 404 are applied to the site to identify the lines along which the solar trackers 100 would be placed if the site were flat. Next at step 506, each north-south line 404 is analyzed along its length to determine changes in elevation along each line. An example of frames which may be manually or automatically analyzed can be seen in FIG. 6. In FIG. 6 six frames are depicted showing the north-south lines 404 as a pair of lines (here red) and a terrain line 406 (black) which depicts the terrain along the solar tracker 100. In frame (a) the terrain line 406 is substantially within the lines detailing the solar tracker 106. As such this portion of the site is likely within the bounds of a generally flat zone requiring little if any ground work, and may be best handled by placing one pier 104 with more or less reveal than the piers 104 around its location.

In frame (b) a change in slope in the terrain line 406 is identified which gradually changes in altitude for the terrain followed by a sharp transition upward. The gradual change in slope requires further analysis to determine if it is within the tolerances discussed above (e.g., less that 0.75 degree change and or less that 4" change in height from one pier 104 to the next). In frame (c) a significant portion of the terrain line 406 is outside of the acceptable range for placement of a solar tracker 100, followed by a sharp return to a height within the solar tracker lines 404. In frame (d) the terrain line 406 is likely with the tolerances for a rolling terrain solar tracker 106 in which the torque tube 106 is pre-loaded to follow the terrain. At point 408 a significant change in terrain indicates a location at which either a break in the solar tracker 100 torque tube should be designed, or at which a series of custom piers 104 may be installed to allow for a continuous torque tube 106. Frame (d) depicts a solar tracker 100 following rolling terrain that may be entirely within tolerances, whereas frame (e) depicts rolling terrain which at least a portion likely falls outside of the tolerances for a rolling terrain solar tracker 100 as described herein.

Figure 7:
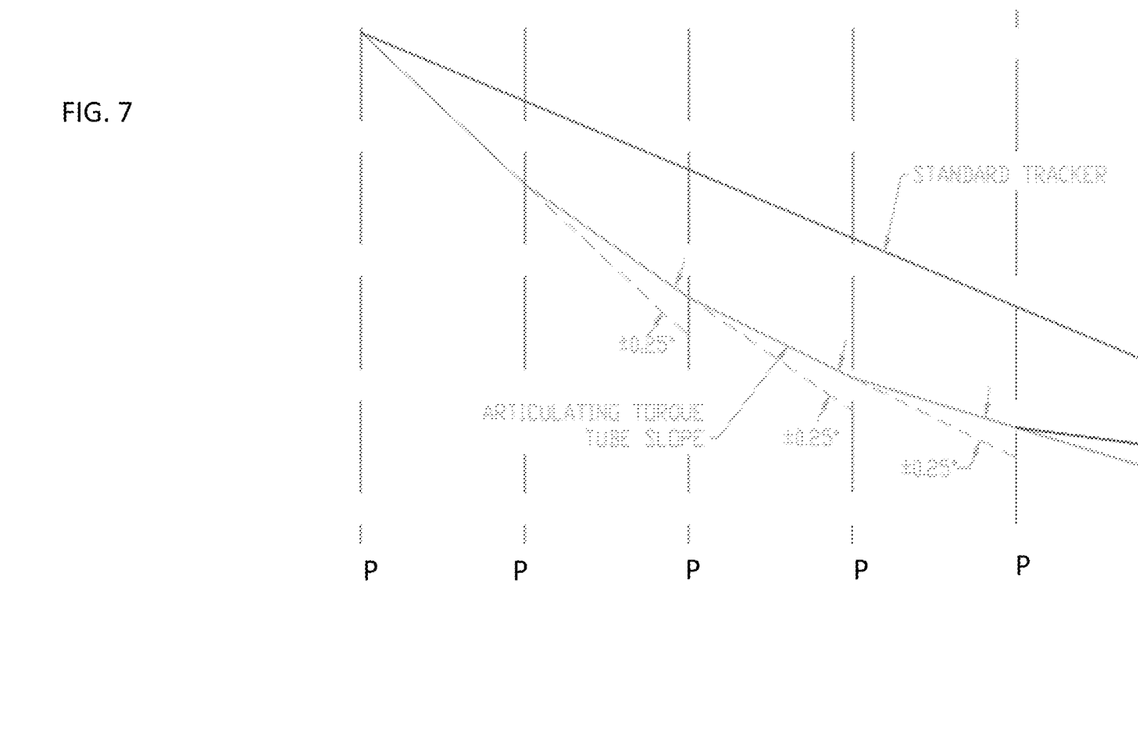
FIG. 7 depicts angular analysis of a solar tracker to follow the terrain of the survey map of FIG. 4.

The foregoing analysis with respect to FIG. 6 is at a relatively high level. For each location along the proposed solar tracker 100 along the north-south lines 404 a more detailed analysis is undertaken to identify the angular changes required to install the actual solar tracker 100. As can be seen at FIG. 7, at each pier 104 location (p) an angular deflection is calculated to enable the torque tube 106 to follow the terrain. As can be seen in FIG. 7, at each pier location (p) a 0.25 degree angle change is necessitated to allow the solar tracker to follow the terrain at this location.

In accordance with the method 500, on the site, following the processes described above with respect to FIGS. 6 and 7, an angular change from pier 104 to pier 104 along the solar tracker 100 is undertaken at step 508. Along with assessing angular changes, at step 510 determinations of locations where the required pre-load of a torque tube 106 would be outside of acceptable tolerances to meet the angular change caused by the terrain. For those portions where this would not be acceptable a determination of a custom pier height can be undertaken at step 512. Next at step 514 a determination can be made whether at any particular location earth grading might be economically acceptable for the site. If for any given location that is out of tolerance in step 510, where a custom pier cannot be used and grading would be undesirable or expensive, a break will be inserted in the torque tube 106 along the solar tracker.

At step 516, a survey map such as depicted in FIG. 4 is output identifying the locations at which solar trackers 106 are to be placed in the site. These locations are the locations at which solar trackers 100 can be installed with a minimum or elimination of earth working of the site, enables the most terrain following of the solar tracker 100 and further with the elimination or a minimum number of custom piers 104 required. All while seeking to maximize the output for the solar array.

Figure 8:
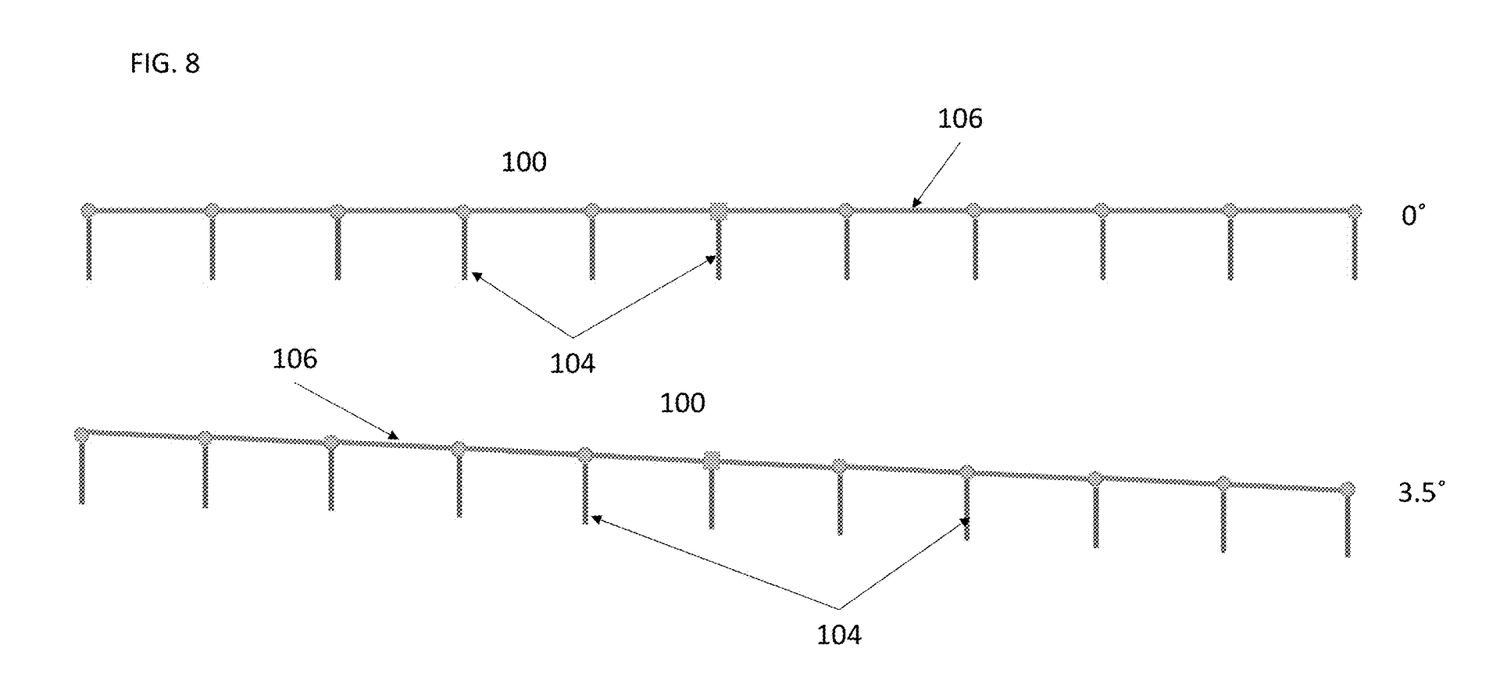
FIG. 8 depicts a solar tracker in accordance with the disclosure.
Figure 9:
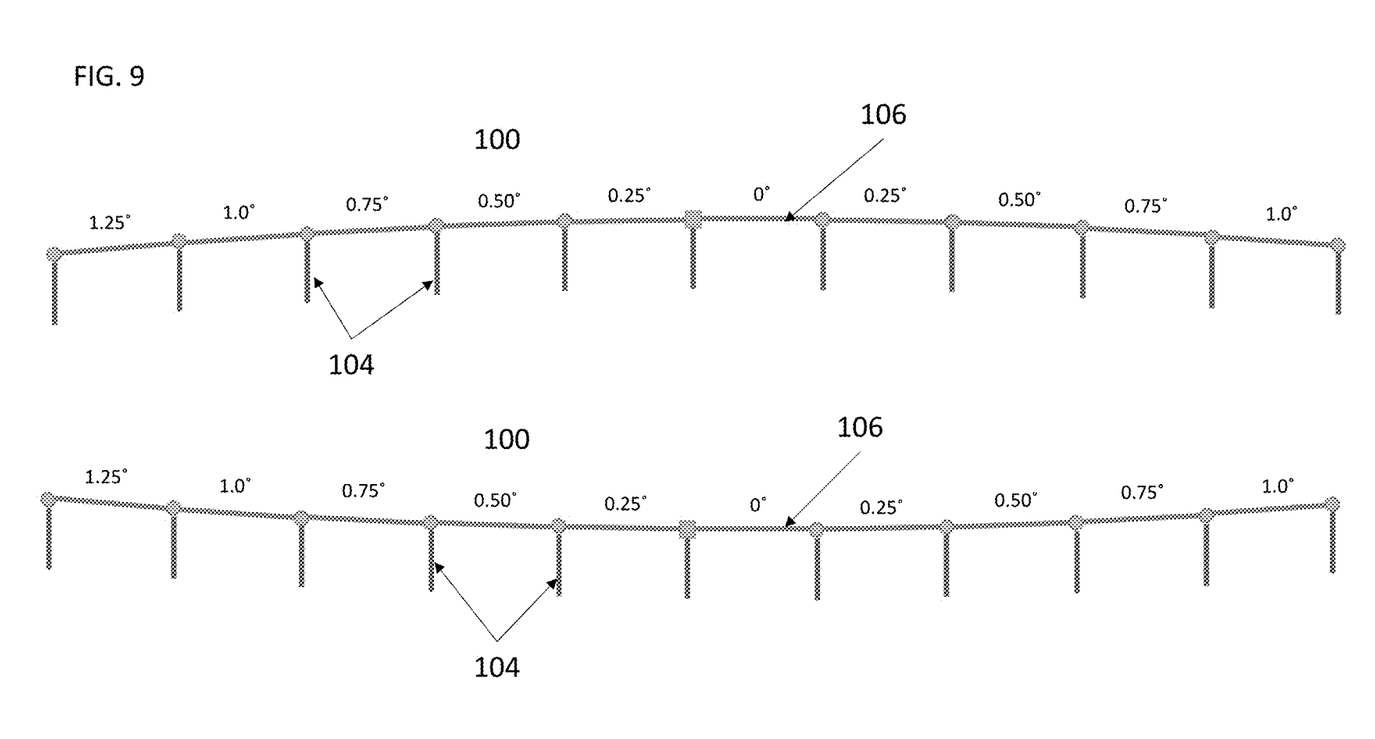
FIG. 9 depicts a solar tracker in accordance with the disclosure.
Figure 10:
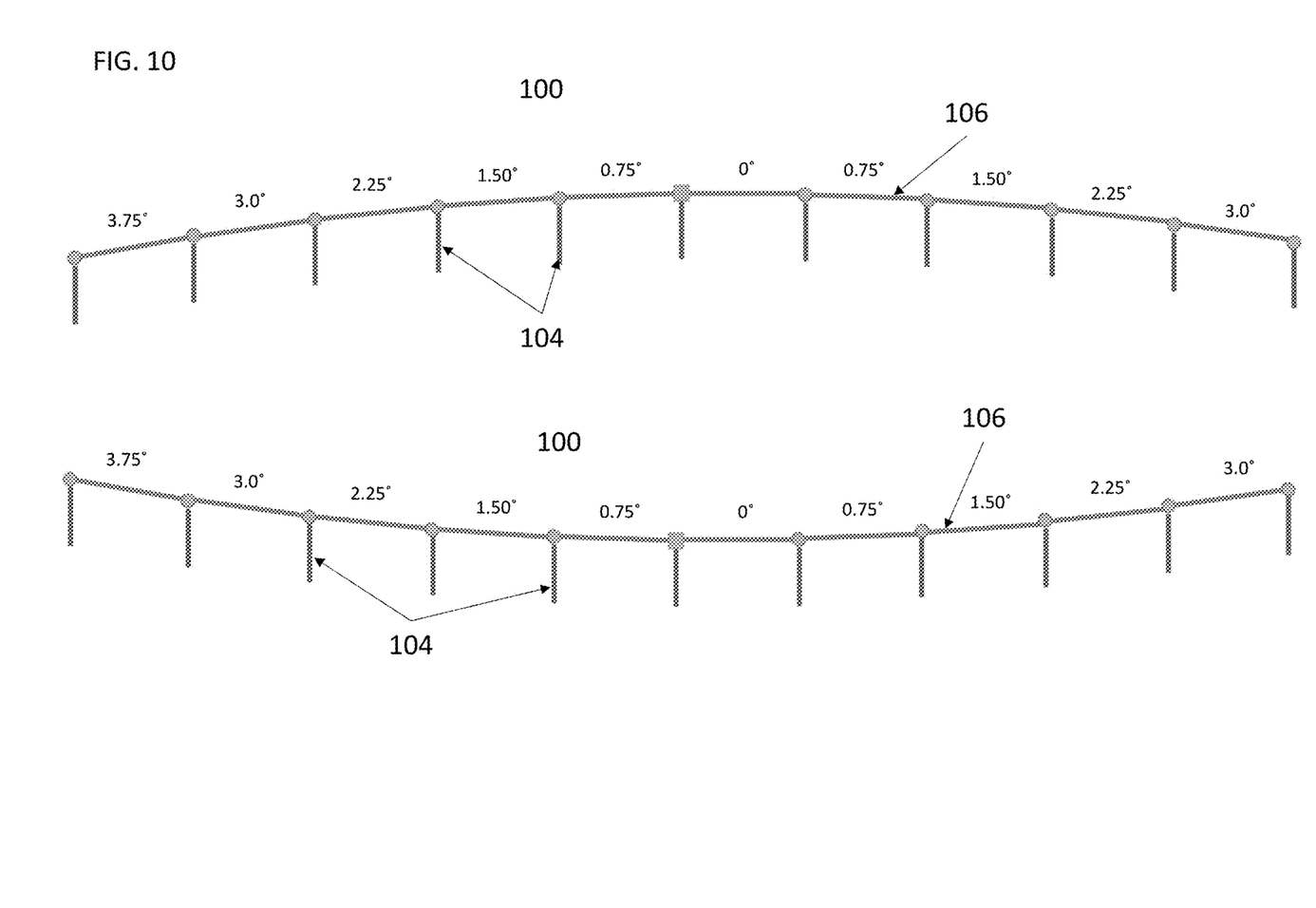
FIG. 10 depicts a solar tracker in accordance with the disclosure.

At any point along the solar tracker 100, the output from the method 500 can be seen in FIGS. 8-10. FIG. 8 for example shows a solar tracker 100 that is substantially flat or even if sloped is uniformly sloped along its length, such an arrangement may allow for a thinner wall torque tube to be installed in locations with this profile. This configuration has a maximum north-south slope of about 3.5 degrees and a pier-to-pier height difference of about 1.5 inches. FIG. 9 shows a solar tracker following very gently rolling terrain its length with a change in angle of only about 0.25 degrees from pier 104 to pier 104 which is well within tolerances. This configuration has a maximum north-south slope of about 8.5 degrees and a pier-to-pier height difference of about 3.5 inches. FIG. 10 depicts an extreme angle change of about 0.75 degrees from pier 104 to pier 104 along its length. This configuration has a maximum north-south slope of about 8.5 degrees and a pier-to-pier height difference of about 4.5 inches. As will be appreciated, any given solar tracker 100 may have aspects of all three examples (FIGS. 8-10) along its length. Though the above describes specific implementations, the disclosure is not so limited and the pier height differential can be between any two piers may be between 0 and 15 inches, and any integer value or fractional value therebetween without departing from the scope of the disclosure. Similarly the north-south slope may be between 0 and 10 degrees and the slope between adjacent piers may be between 0 and 2.5 degrees and any integer or fractional value between the stated ranges without departing from the scope of the disclosure.

As a result of these methods, a designer is able to assess a given site and determine with greater accuracy the costs and the timing associated with the installation. Further, by enabling the terrain following solar trackers, much if not all of the earth moving and custom component acquisition can be eliminated. Still further, these methods and devices enable sites that previously were unacceptable to be assessed for their electrical generation output capabilities.

To enable the methodology of FIG. 5 a computing device may be employed. The computing device may include a memory, a processor, a display, a network interface, an input device, and/or an output module. The memory may store one or more applications and/or image data. The application (which may be a set of executable instructions) may, when executed by processor, cause display to present a graphical user interface (GUI) based on GUI instructions and/or perform cause processor to perform any other operation associated with the instructions stored thereon. Application may also provide the interface between one or more components of the system (e.g., one or more of the surgical instruments) and the computing device, through, for instance, Bluetooth and/or Wi-Fi. GUI may be displayed on display during the performance of any of the disclosed methods. The display may include AR/VR headsets.

The memory may include any non-transitory computer-readable storage media for storing data and/or software (instructions) executable by processor and which controls the operation of computing device and/or various components of the system, when in communication with the components (e.g., with the optical cameras, light sources, scanners, IR cameras, etc.). In embodiments, memory may include one or more solid-state storage devices such as flash memory chips. Alternatively, or in addition to the one or more solid-state storage devices, memory may include one or more mass storage devices connected to processor through a mass storage controller (not shown) and a communications bus (not shown). Although the description of computer-readable media contained herein refers to a solid-state storage, it should be appreciated by those skilled in the art that computer-readable storage media can be any available media that can be accessed by processor. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device.

Network interface may be configured to connect to a network such as a local area network (LAN) including a wired network and/or a wireless network, a wide area network (WAN), a wireless mobile network, a Bluetooth network, and/or the Internet. Input device may be any device through which a user may interact with computing device, such as, for example, a mouse, keyboard, foot pedal, touch screen, and/or voice interface. Output module may include any connectivity port or bus, such as, for example, parallel ports, serial ports, universal serial busses (USB), or any other similar connectivity port.

Any of the above aspects and embodiments of the present disclosure may be combined without departing from the scope of the present disclosure. While detailed embodiments are disclosed herein, the disclosed embodiments are merely examples of the disclosure, which may be embodied in various forms and aspects. Therefore, specific structural and functional details disclosed herein are not to be interpreted as limiting, but merely as a basis for the claims and as a representative basis for teaching one skilled in the art to variously employ the disclosure in virtually any appropriately detailed structure.

We claim:

1. A rolling terrain following solar tracker comprising:
a first plurality of piers embedded into rolling terrain and arranged in a row, the first plurality of piers being at differing heights relative to each other due to the rolling terrain;
a torque tube extending along the first plurality of piers at the differing heights relative to each other such that the torque tube substantially follows a contour of the rolling terrain, the torque tube formed of a second plurality of sections, the second plurality of sections being interconnected and having one end which is swaged and another end unswaged such that the swaged ends are inserted in the unswaged ends to form the torque tube, the torque tube passing through a third plurality of bearings that are respectively mounted on the piers at the differing heights, the torque tube extending along the first plurality of piers at the differing heights relative to each other bending and pre-loading the torque tube;
a first section of the second plurality of sections extending from a first pier of the first plurality piers to a second pier of the first plurality of piers; and
a second section of the second plurality of sections extending from the second pier to a third pier of the first plurality of piers, the difference in pier heights causing bending along a length of the first section and pre-loading the first section to form a relative angle between the first section and the second section of between 0.25 and about 0.75 degrees to enable the torque tube to follow contour variations in the rolling terrain.

2. The rolling terrain following solar tracker of claim 1, wherein a difference in pier height from the first pier to the second pier is between 1.5 and 15 inches.

3. The rolling terrain following solar tracker of claim 1, wherein a difference in pier height from the first pier to the second pier is between 1.5 and 4.5 inches.

4. The rolling terrain following solar tracker of claim 1, wherein a maximum north-south slope is between 3.5 and 10 degrees.

5. The rolling terrain following solar tracker of claim 1, wherein the relative angle between the plurality of piers varies along the torque tube such that the torque tube is substantially parallel to the contour of the rolling terrain.

6. The rolling terrain following solar tracker of claim 1, wherein relative angles between the first plurality of piers varies along the torque tube such that the torque tube follows elevational variations in the rolling terrain.

7. The rolling terrain following solar tracker of claim 1, wherein relative angles of each of the second plurality of sections varies along the torque tube such that the bending and pre-loading of the torque tube causes the torque tube to follow elevational variations in rolling terrain.

8. The rolling terrain following solar tracker of claim 1, wherein the swaged ends inserted into the unswaged ends forms overlapping sections having a double-wall thickness.

9. The rolling terrain following solar tracker of claim 8, wherein the overlapping sections are placed proximate the piers of the first plurality of piers.

10. The rolling terrain following solar tracker of claim 9, wherein the overlapping sections are placed proximate the piers of the first plurality of piers where bending moments of the bending of the torque tube are highest.

11. The rolling terrain following solar tracker of claim 1, wherein the first plurality of piers embedded in the rolling terrain and arranged in the row comprises the first plurality of piers embedded in the row of varying contour.

12. The rolling terrain following solar tracker of claim 1, wherein the torque tube formed of the second plurality of sections is a pre-loaded continuous torque tube.

13. The rolling terrain following solar tracker of claim 12, wherein the pre-loaded continuous torque tube passes through the third plurality of bearings that are respectively mounted on the piers at the differing heights.

14. The rolling terrain following solar tracker of claim 12, wherein a central longitudinal axis of the first section of the continuous torque tube is angularly deflected from a central longitudinal axis of the second section of the continuous torque tube between 0.25 and about 0.75 degrees to enable the torque tube to follow contour variations in the rolling terrain.

15. The rolling terrain following solar tracker of claim 14, wherein the central longitudinal axis of the first section of the continuous torque tube is angularly deflected from the central longitudinal axis of the second section of the continuous torque tube to cause the central longitudinal axis of the first section of the continuous torque tube to be non-parallel to the central longitudinal axis of the second section of the continuous torque tube.

16. The rolling terrain following solar tracker of claim 1, wherein the first plurality of piers being at differing heights relative to each other due to the rolling terrain comprises each of the first plurality of piers being at different heights above the rolling terrain.

* * * * *